Patented June 4, 1935

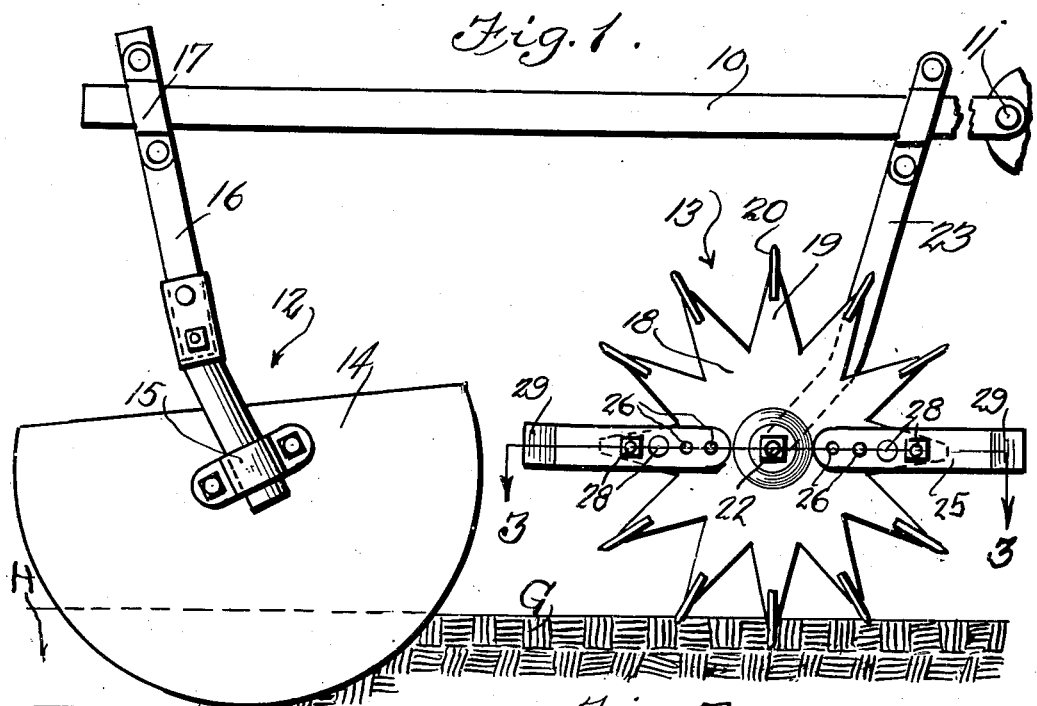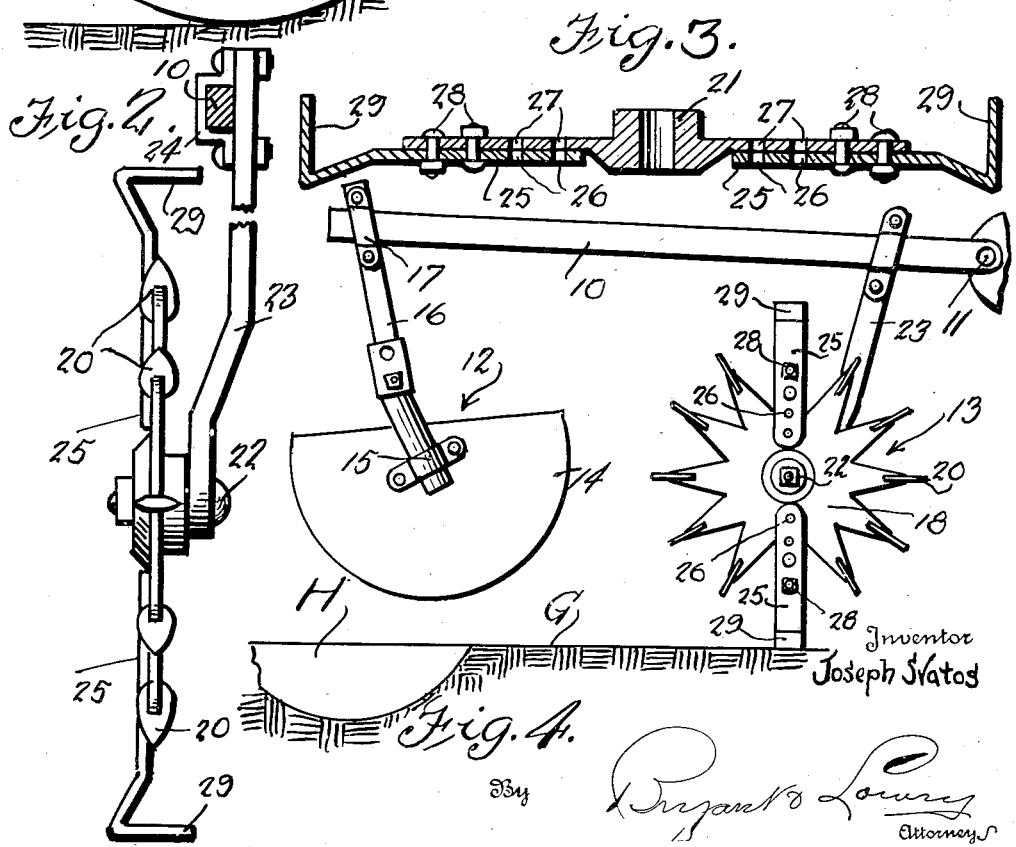

2,003,871

UNITED STATES PATENT OFFICE 2,003,871

EARTH WORKING IMPLEMENT

Joseph Svatos, Yankton, S. Dak., assignor of one-fourth to Joseph Svatos, Jr., Yankton, S. Dak.

Application February 7, 1935, Serial No. 5,490

2 Claims. (Cl. 97—55)

This invention relates to certain new and useful improvements in earth working implements.

The primary object of the invention is to provide an earth working implement designed for the digging of holes in spaced relation in ground and especially on hillsides for the collection of rain water to aid in irrigation. The water resulting from heavy rains rapidly drains or runs off ground, especially inclines of various degrees and the present invention is designed to provide a checker work for cavities or holes for the collection of such water to insure seepage thereof into the ground to aid irrigation.

A further object of the invention is to provide an earth working implement of the foregoing character, preferably associated with the beam of a cultivator and embodying a structure of star formation with shoes selectively attached to certain points of the star wheel that is mounted on the cultivator beam to effect successive raising and lowering of a shovel carried by the cultivator beam rearwardly of the star wheel for the digging of holes in the ground in spaced relation.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view of the cultivator beam illustrated as pivotally mounted at its forward end and carrying a shovel at its rear end and a traction wheel of star formation designed to effect raising and lowering movements of the shovel for the digging of holes in spaced relation;

Figure 2 is an edge elevational view of the star wheel with the cultivator beam shown in section and illustrating the shoes carried by the star wheel for raising and lowering the shovel;

Figure 3 is a cross-sectional view taken on line 3—3 of Figure 1, showing the adjustable mounting on the star wheel for the shovel elevating shoes; and Figure 4 is a side elevational view, similar to Figure 1, showing one of the shoes carried by the star wheel engaging the ground with the shovel elevated.

Referring more in detail to the accompanying drawing, the reference character 10 designates a cultivator beam that is pivotally mounted at its forward end as at 11 upon a draft device, the cultivator beam carrying a digging shovel 12 at its rear end and a traction wheel construction 13 forwardly of the shovel and adjacent the beam pivot 11 to effect pivotal movement of the cultivator beam and raising and lowering movements of the shovel 12.

The shovel 12 comprises a blade 14 carrying a strap 15 upon one face thereof for the attachment of the lower end of the leg 16 that is anchored at its upper end as at 17 upon the rear end of the cultivator beam 10.

The traction wheel 13 preferably comprises a star wheel 18 provided with points 19 with a transverse traction finger 20 at the outer end of each star wheel point 19 adapted for ground engagement to effect positive rotation of the star wheel. The mounting for the star wheel 18 includes the nave 21 journalled on the axle or bolt 22 which in turn is rotatably mounted in a bearing in the lower end of the leg 23 that is attached at its upper end as at 24 to the cultivator beam 10 adjacent the pivot 11 as illustrated in Figures 1 and 4.

Means is associated with the star wheel 18 to effect pivotal movement of the cultivator beam 10 on its pivotal mounting 11 and the raising and lowering movement of the shovel blade 14, such means comprising a shoe in the form of a strap 25 having a series of openings 26 therein that are selectively registerable with openings 27 formed in diametrically opposite points 19 of the star wheel 18 with nut and bolt combinations 28 associated with the registering openings for anchoring the shoes in position on the star wheel. The outer end of each strap 25 of the shoes is provided with an angle foot 29 extending transversely of the star wheel for flat engagement with the ground during tractive rotation of the star wheel.

As illustrated in Figure 1, the earth working implement moves over the ground G with the traction fingers 20 contacting the ground to effect rotation of the star wheel 18. The length of the shovel leg 16 compared with the leg 23 carrying the star wheel is such that the shovel blade 14 digs into the ground G to provide a cavity or hole H. The cross foot 29 of the elevating shoe extends outwardly of the periphery of the star wheel 18 defined by the traction finger 20 and when one of said feet 29 moves into ground contact as indicated in Figure 4, the shovel blade 14 is elevated out of the hole H and above the ground line G, the shovel blade being again lowered when the foot 29 escapes the ground for the downward pivotal movement of the cultivator beam 10 to place the traction fingers 20 in position for ground contact. It will be noted that during movement of the earth working implement carrying the cultivator beam 10 to the devices 12 and 13 carried thereby, the traction device 13 in the form of a star wheel 18 is rotated by ground contact of the traction fingers 20 with the blade 14 of the shovel 12 digging a hole H in the ground G. The cultivator beam 10 has the rear end thereof successively elevated when the angle foot 29 of the shoe moves into ground contact as shown in Figure 4 for raising the shovel blade 14 that is subsequently lowered for the digging of subsequent holes in spaced relation. It is to be understood that any number of elevating shoes may be associated with the star wheel 18 which will determine the spacing of the holes in the ground. The desired area of ground may be checkered with the present earth working implement for the production of holes for the collection of rain water to aid in irrigation.

While there is herein shown and described the preferred embodiment of the invention, it is nevertheless to be understood that minor changes may be made therein without departing from the spirit and scope of the invention as claimed.

I claim:—

1. In an earth working implement, the combination with a pivotally mounted beam, of a trenching shovel carried by the rear end of the beam, and a ground engaging member on the beam forwardly of the shovel and constructed and arranged to effect intermittent pivotal movement of the beam and elevation of the shovel above the ground line during the forward travel of the implement for digging trenches in spaced relation, the ground engaging member comprising a star wheel and shoes carried by at least two points of the star wheel and projecting outwardly of the periphery thereof for effecting the pivotal movement of the beam.

2. In an earth working implement, the combination with a pivotally mounted beam, of a trenching shovel carried by the rear end of the beam, and a ground engaging member on the beam forwardly of the shovel and constructed and arranged to effect intermittent pivotal movement of the beam and elevation of the shovel above the ground line during the forward travel of the implement for digging trenches in spaced relation, the ground engaging member comprising a star wheel, a ground traction finger carried by each point thereof, and shoes adjustably attached to at least two points of the star wheel and having an angular flat foot projecting outwardly of the periphery of the star wheel and traversing the plane of the wheel for effecting the pivotal movement of the beam.

JOSEPH SVATOS.